United States Patent [19]

Höller et al.

[11] Patent Number: 4,516,399
[45] Date of Patent: May 14, 1985

[54] HYDRAULIC COUPLING

[75] Inventors: Heinz Höller; Wolfgang Weber, both of Crailsheim, Fed. Rep. of Germany

[73] Assignee: Voith Turbo GmbH & Co. KG, Crailsheim, Fed. Rep. of Germany

[21] Appl. No.: 543,530

[22] Filed: Oct. 20, 1983

[30] Foreign Application Priority Data

Oct. 30, 1982 [DE] Fed. Rep. of Germany ....... 3240334

[51] Int. Cl.³ .............................................. F16D 33/12
[52] U.S. Cl. ........................................ 60/351; 60/357; 60/359
[58] Field of Search ................. 60/351, 357, 359, 360, 60/366, 356

[56] References Cited

U.S. PATENT DOCUMENTS

| 2,347,121 | 4/1944 | Patterson | 60/356 |
| 2,875,581 | 3/1959 | Kugel | 60/360 |
| 3,200,595 | 8/1965 | Becker | 60/351 |
| 3,426,535 | 2/1969 | Mlacker et al. | 60/366 |

FOREIGN PATENT DOCUMENTS

| 919449 | 10/1954 | Fed. Rep. of Germany. |  |
| 2639683 | 3/1978 | Fed. Rep. of Germany. |  |
| 385086 | 12/1932 | United Kingdom | 60/357 |
| 771408 | 4/1957 | United Kingdom | 60/359 |
| 803462 | 10/1958 | United Kingdom | 60/357 |
| 994256 | 6/1965 | United Kingdom. |  |

OTHER PUBLICATIONS

Voith Publication, "Voith-Turbokupplungen fur Verbrennungskraftmaschinen".

Primary Examiner—Irwin C. Cohen
Attorney, Agent, or Firm—Kuhn Muller and Bazerman

[57] ABSTRACT

A hydraulic coupling is disclosed which has a primary bladed wheel and a secondary bladed wheel confining a torus-shaped operating space. A blade-free ram space is provided inside the blading of the primary wheel. A delay chamber rotating with the primary wheel is connected by channels respectively to the ram space and to the operating space. In each of the channels, a switchable valve is provided which operates depending on the primary speed. A scoop tube is fixed to the secondary wheel. The scoop tube has inlet opening of the tube in the radially outermost region of the inner space of the coupling. The scoop tube directs operating fluid into the radially inner region of the coupling, from where the fluid can reach the delay chamber through the valve assigned to the channel.

15 Claims, 1 Drawing Figure

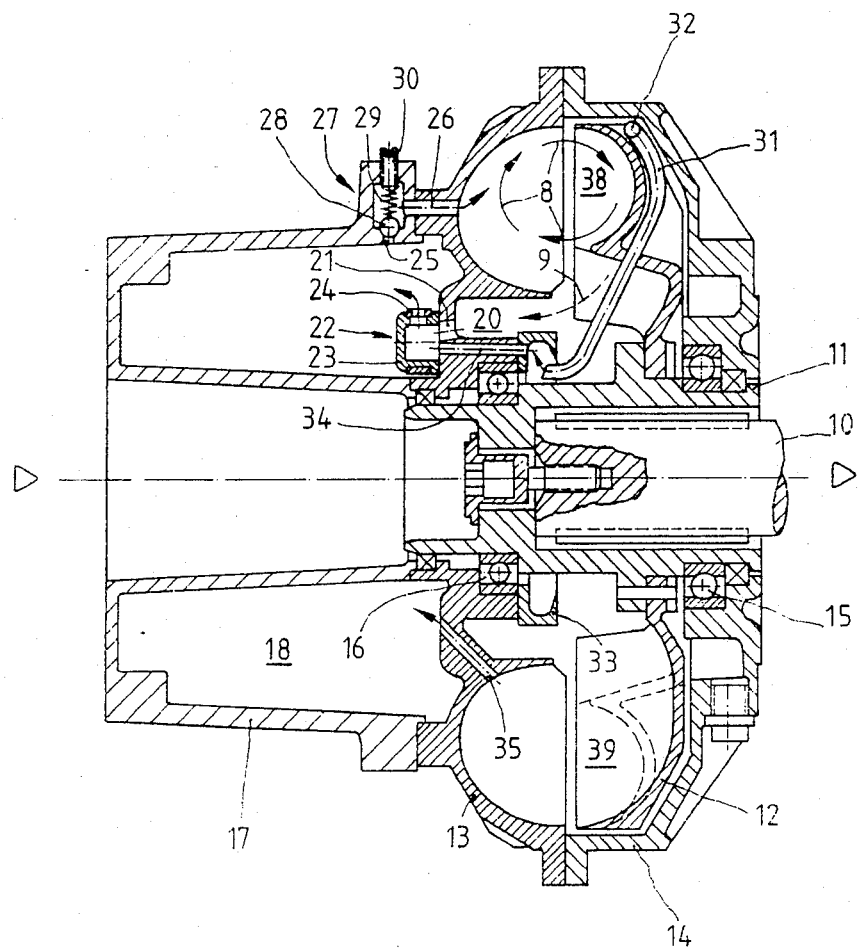

HYDRAULIC COUPLING

BACKGROUND OF THE INVENTION

This invention relates to fluid couplings and, more particularly, to a hydraulic coupling having an input member, characterized as a bladed primary wheel or impeller, and an output member, characterized as a bladed secondary wheel or runner, confining an operating space.

A hydraulic coupling transfers energy from a drive, such as an engine or a motor, to a production machine or to the drive shaft of a vehicle. The start-up of the drive from a rest position is eased by the use of a hydraulic coupling. During the drive, for example, an internal combustion engine, rotates only at its idling speed, the torque transferred from the hydraulic coupling should be minimal so that the production machine or vehicle remains at rest.

The invention relates exclusively to hydraulic couplings constructed such that they can be operated by a constant quantity of fluid, i.e., with the coupling at rest, its inner chamber is filled by a definite volume of working or operating fluid. The volume remains unchanged during operation. Another type of hydraulic coupling utilizes an external circulatory flow arrangement which permits the degree of filling in the coupling to be varied during operation. In this way, during start-up of the drive, or during idling, the filling degree of the hydraulic coupling can be kept very low. The additional expense for the external flow circulation, however, is worthwhile only in the case of high power levels.

A hydraulic coupling is disclosed by Voith reference manual Cr 137 "Voith-Turbokupplungen fur Verbrennungskraftmaschinen" (Voith Turbocouplings for Internal Combustion Engines) which has a blade free ram space set radially within the blading of a primary wheel. This coupling, which has an especially short construction, is preferred in farm tractors, earth-moving machines and similar equipment. During normal operation, i.e. with the motor rotating at its nominal speed, slip is very low, on the order of two percent. If the drive rotation (the primary rotation rate) is reduced, a part of the flow is transferred to the ram space such that the slippage increases noticeably, i.e., the secondary rotation rate drops off to a greater extent than the primary rotation rate. In the motor idling mode, the torque transferred from the coupling is reduced to a residual amount, the so-called idling run or drag moment. In the applications named above, the idling run moment of the known coupling is small enough. However, it is still too high for the more easily starting production machines or vehicles. Thus, the secondary side begins to rotate in undesired fashion even though the drive is idling.

Attempts have been made to prevent the undesired movement of the secondary side. U.S. Pat. No. 2,347,121, for example, discloses the use of gate elements which, during motor idling, swing into the flow path of the operating fluid so as to disrupt the flow of the fluid and thus reduce the torque transferred between the coupling elements. The utilization of these gate elements, also characterized as mobile valves, substantially increases fabrication cost.

SUMMARY OF THE INVENTION

In accordance with the invention, a comparatively large delay chamber is provided, as known from U.S. Pat. No. 2,875,581 (FIG. 6), to take up part of the operating fluid in the resting state of the coupling. This produces the situation in which, initially, the bladed operating space of the coupling is only partially filled with operating fluid so that the drive can be started with ease. Thereafter, the degree of filling in the bladed operating space gradually increases so that the production machine or the vehicle accelerates gently. During nominal rotating speed operation, a ball valve in a pipe connecting the delay chamber to the operating chamber opens such that the total operating fluid flows from the delay chamber into the operating space. A valve between the ram space and the delay chamber is then closed so that no operating fluid can then leak into the delay chamber. If it is now desired to halt the production machine or vehicle by reducing the drive speed, both valves shifted when the drive speed falls below defined rotating speeds; i.e., the outer ball valve closes the connection from the delay chamber to the operating space, and the inner valve opens the connection from the ram space to the delay chamber. Thus, the fluid in the ram space flows to the delay chamber. In other words, there is a more substantial emptying of the bladed operating space than is found in the known coupling such as is disclosed by Voith reference manual Cr 137 or by U.S. Pat. No. 2,347,121.

During idling, the torque transferred from the hydraulic coupling is, as a consequence, greatly reduced. However, some residual torque still remains which is, in some applications, inconvenient. This residual torque may result from a small part of the operating fluid which remains in the bladed operating space during idling of the drive.

The invention is designed to solve the problem by providing an improved hydraulic coupling in which, at reduced primary rotational speeds, for example, motor idling speed, the torque transfer is reduced further than has been achieved heretofore.

A hydraulic coupling, with a constant volume of operating fluid, of the type having a bladed primary wheel and a bladed secondary wheel confining a torus-shaped operating space, in accordance with the invention, is provided with a bladeless annular ram space set along the inner radius of the radially extended blading of the primary wheel. A delay chamber, which rotates with the primary wheel, is connected through a channel to the ram space and to the operating space. A first valve is provided in the channel between the ram space and the delay chamber. The first valve is operative to close the channel only when the primary rotational speed is greater than a first switching speed. A second valve is provided in a channel leading from the delay chamber to the operating space. The second valve is operable to open when the primary rotational speed is greater than a second switching speed. A scoop tube is fixed to the secondary wheel. The scoop tube has an inlet opening at the radially outer region of the interior of the coupling and extends to a switch valve at the radially inner region of the coupling. The switch valve is operable to allow operating fluid to pass from the scoop tube to the delay chamber when the primary rotational speed is less than a third switching speed. The scoop tube rotates together with the secondary bladed wheel. As long as the slippage is small, in normal operation, the scoop tube has no effect; i.e., it delivers no operating fluid and does not oppose the power transfer of the coupling in normal operation. If, however, due to a reduction of the primary rotation speed, a sharp drop in the rotary speed appears on the secondary side by the action of the ram space and the delay chamber, the dynamic pressure on the inlet opening of the scoop tube increases because of the amplified difference in speeds to such an extent that the effect of the centrifugal force on the fluid head in the drag tube is overcome. Thereafter, the scoop tube delivers the total amount of fluid remaining in the bladed operating space into the radial inner region of the coupling, from which it goes to the delay chamber.

Test measurements have shown that the remaining residual idling torque attained by the structural form of the invention, compared to known couplings, can be substantially reduced further. The measured residual torque then corresponds to that value caused by friction in the bearings and the shaft gaskets and by the availability of air in the bladed operating space.

If it is desired that the emptying of the bladed operating space in the coupling occurs in the shortest time possible, in the event of a drop in the rotation speed of the drive, it is advisable to provide a concentric trap channel in the primary wheel in the vicinity of the ram space which receives the discharge end of the scoop tube. Fluid from the scoop tube is then discharged into the trap channel. A channel connects the trap channel to the switch valve. This guarantees that the scooped operating fluid is led to the delay chamber by the most direct route without any part of the fluid leaking back into the bladed operating space.

It was feared that during the acceleration of the operating machine, the presence of the scoop tube would have a bad effect. For as long as the slippage is still large, the scoop tube is still effective. However, during this start-up process, the primary blade wheel is already rotating at the nominal drive motor speed so that the connection from the outlet of the scoop tube to the delay chamber, through the switch-valve there, is already closed. Thus, although the scoop tube is still delivering operating fluid initially, the fluid cannot reach the delay chamber; it simply flows back to the bladed operating space.

A hydraulic coupling, in which the inlet opening of a scoop tube is set in the radially outermost region of the back side of the secondary bladed wheel is, in fact, disclosed in West German Pat. No. 919,449. There, however, the coupling has an outer fluid circulation in which the said scoop tube serves a purpose entirely different from that of the invention. The purpose to be attained is that the flow density in the outer fluid circulation at normal primary rotation speed and at simultaneously increased slippage of the coupling remain constant or increase with the slippage. The effect of the invention cannot be obtained from the disclosure of the German patent since neither a pressure space nor a delay chamber is disclosed.

A hydraulic coupling, with a constant volume of operating fluid, is disclosed in West German Auslegeschrift No. 26 39 683 which has a ram space and a delay chamber. This coupling also has a scoop tube that circulates with the secondary wheel and delivers operating fluid into the delay chamber. In contrast to the coupling of the invention, the known coupling has the following characteristics: the delay chamber rotates with the secondary wheel and with a coupling housing fixed to it which surrounds the pump wheel. The inlet opening of the drag tube is either in a fluid collector ring on the back side of the primary wheel or in the radially inner region of one of the second blade channels. With this type of construction, the bladed operating space cannot be completely emptied at reduced primary rotation speed, for example the idling speed of the drive motor. This itself would be impossible if the inlet opening of the drag tube were placed in the radially outermost region of the coupling since the coupling housing and the scoop tube rotate at the same speed. Moreover, a complete emptying of the operating space in the known coupling would bring with it the danger that the coupling transfers too small a torque in acceleration of the secondary side from the resting state. If, however, the secondary side is still motionless, the total operating fluid would be in the (equally motionless) delay chamber, the fluid required for the power transfer would be lacking in the operating space, at least initially. Since the delay chamber (as mentioned) is initially in the resting state, the operating fluid would pass only very slowly from the delay chamber to the operating space, especially in the presence of the valve, shown in FIG. 3 of West German Auslegeschrift No. 26 39 683, which opens as a function of the secondary rotation speed. The danger just described is not applicable to the coupling of the invention since the delay chamber always rotates with the primary wheel as does the second valve inserted between the delay chamber and the operating space. Under these circumstances, the operating fluid quickly passes from the delay chamber to the operating space under high power levels of the primary side. In a departure from the known coupling, the shell of the coupling in the invention rotates with the primary wheel. In this way, the scoop tube can almost completely remove the residual fluid gathered even in the radially outermost region of the shell's inner space. Hereby, it is avoided that a slipping torque due to slot friction in the ring slot between the secondary wheel and the shell is kept from being transferred to the secondary wheel.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The FIGURE illustrates a longitudinal cross section of a hydraulic coupling in accordance with the invention.

DETAILED DESCRIPTION

Referring now to the drawing in detail, there is shown a hydraulic coupling with a driven shaft 10. A hub 11 of the secondary bladed wheel, the runner 12, is non-rotatably fixed to the driven shaft 10. The primary bladed wheel, impeller 13, is mounted on the hub 11 for rotation relative to hub 11 in combination with a coupling shell 14 with the aid of the roller bearings 15 and 16. The primary and secondary bladed wheels comprise a plurality of circumferentially spaced radial vanes. To the outer side of the primary bladed wheel 13 is fixed a drive shell 17 which encloses the delay chamber 18. The drive shell 17 may be connected to a drive shaft (not shown). A blade-free space 20, the so-called ram space (or accumulator chamber), is annually set at the inside radius of the blading of the primary wheel 13. A connecting channel 21 leads from ram space 20 to the inner space of a rotary slide valve, indicated as a whole by reference numeral 22. Valve 22 has a housing 23 fixed in the known manner to the primary wheel 13 and a ring-shaped rotating shell 24 on the outer side. The rotary slide valve 22 is kept open in its resting position (as indicated) by means of a spring (not shown). If the primary wheel 13 exceeds a definite predetermined speed, characterized as the first switching speed, a centrifugal body (not shown) fixed to the shell 24 rotates the shell 24 relative to the housing 23 so that the valve closes.

The delay chamber 18 is connected through a channel 25, 26 to the torus-shaped operating space which is limited by the bladed wheels 12 and 13. Another switchable valve, its switching dependent on the primary rotation speed, is in the channel 25, 26 just named. This valve has the shape of a ball valve and is indicated, as a whole, by reference numeral 27. In the known way, as a mobile valve body, it is made up of a ball 28, pressed into its resting state by a spring 29 against a valve seat, and thus keeps the valve closed. If the primary wheel 13 exceeds a definite speed ("second switching speed") the ball 28 leaves its seat and thus opens the valve. The tension of the spring 29, and therefore the magnitude of the second switching speed, can be varied by turning a set screw 30. In similar fashion, the first switching speed can be varied at the rotary slide valve 22 by changing the tension of the spring.

A scoop tube 31 is mounted on the secondary wheel 12. An inlet opening 32 of the scoop tube 31 is in the region of the back side of the secondary wheel 12 and, in fact, in the radially outermost region of the inner space enclosed by the shell 14. The radially outer region of the scoop tube is distorted in such fashion that the inlet opening 32 is directed toward the direction of rotation of the primary wheel 13. In this way, the scoop tube 31 can pick up and remove the fluid in the shell 14 that is circulated by the primary wheel 13. The scoop tube 31 extends in the direction toward the central coupling rotational axis until it gets as close as possible to the hub 11 and empties into a circular trap channel 33 mounted radially inside the ram space 20 on the primary wheel 13. The trap channel 33 is connected, through a channel 34, to the inner space of the rotary slide valve 22 described above. In this way, the operating fluid delivered by the scoop tube 31 into the trap channel 33 reaches the delay chamber 18 as long as the rotary slide valve 22 is open. Otherwise, the operating fluid reaches the ram space 20 through channel 21, and returns from there to the bladed operating space.

Other than the structure presented, a plurality of circumferentially spaced rotary slide valves 22 may be provided. For example, there may be two such valves of which one, closed above the "first switching speed," is assigned to the channel 21 coming from the ram space 20, while the other valve, closed only above a "third switching speed", is assigned to the channel 34 coming from the trap channel 33. As a rule, however, both valves would be closed at the same value, i.e., the "third switching speed" is the same as the "first switching speed."

In normal operation, i.e., when the primary wheel 13 runs at the same rate as the nominal motor speed, and when the secondary wheel 12 runs at the rate corresponding to the normal operating speed of the machine (or vehicle) to be driven, the coupling operates with only low slipping. The toroidal flow then prevailing is indicated by the arrows 8. The ball valve 27 is opened so that the total operating fluid can pass from the delay chamber 18 into the operating space. The rotary slide valve 22 is locked in this operating condition. The scoop tube 31 mounted on the secondary wheel 12 is ineffective, on the one hand because of the small difference in rotation speeds between the bladed wheels 12 and 13, and on the other because of the centrifugal force operating on the fluid head in the tube 31.

If the motor rotating speed is reduced in order to stop the secondary side of the coupling, the following occurs: the ball valve 27 closes when the primary speed falls below the "second switching speed" named above, whereby the connection from the delay chamber 18 to the operating space is broken. Thereafter, when the primary speed falls below a somewhat lower speed, the "first switching speed," the rotary slide valve 22 opens. As a rule, the "first switching speed" is set at a somewhat lower value than the "second switching speed," to prevent overlapping. With a drop in the primary rotation speed, the slipping of the clutch increases, so that gradually, an always larger part of the operating fluid gets into the ram space 20 (through the path indicated by the dashed arrow 9) and from the ram space 20 through the rotary slide valve 22 into the delay chamber 18. If a backfill bore, indicated by reference numeral 35, has been provided, the operating fluid can also flow from the operating space through this bore directly into the delay chamber 18. In any case, an increased drop in the secondary speed occurs in which the difference in rotational speeds between the primary and secondary wheels climbs sharply and the centrifugal effect on the fluid head in the scoop tube 31 is also strongly reduced. This means that the scoop tube 31 then goes into action, delivering the residual fluid still remaining in the operating space and in the shell 14 to flow into the delay chamber 18.

The machine to be driven is re-started by increasing the drive motor speed above the named switching speeds of the valves 22 and 27. By so doing, the rotary slide valve 22 closes and the ball valve 27 opens so that the operating fluid gets back into the operating space. Although the scoop tube 31 is initially still effective, the closed rotary slide valve 22 prevents reverse flow of the operating fluid into the delay chamber 18.

In contrast to the structure shown, a surrounding trench can be provided in the shell 14 at the outermost end of the scoop tube 31. The inlet opening 32 of the scoop tube 31 can then be shifted outward even further radially than indicated in the drawing.

The secondary wheel 12 of the embodiment shown has alternating blade cells of various radial lengths. Thus, in the upper half of the drawing the blade cell 38 has comparatively smaller radial length, and the lower half shows a blade cell 39 of larger radial length. In this situation, it is best to assign the scoop tube 31 to the back side of a blade cell 38 with smaller radial length. Incidentally, however, the type of secondary wheel 12 shown is of no importance to the invention. A secondary wheel having many cells of large radial length may also be used; i.e., the total blade cells would have the form indicated by 39.

West German Pat. No. 14 25 394, corresponding to British Pat. No. 994,256, discloses a rotary slide valve which is used in a preferred embodiment of the invention. A preferred structure for the secondary bladed wheel in the inventive arrangement is disclosed in West German Pat. No. 14 75 509 which corresponds to U.S. Pat. No. 3,426,535.

Thus, in accordance with the invention, a hydraulic coupling with a bladed primary wheel 13 and a bladed secondary wheel 12 confining an operating space, is characterized by a bladeless ram space 20 set radially within the blading of the primary wheel 13, a delay chamber 18, rotating with the primary wheel 13, connected through a channel 21 or 25, 26 with the ram space 20 and with the ram space. In the channel 21 leading from the ram space 20 to the delay chamber 18, a first valve 22 is provided which is closed only when the primary rotational speed is greater than a first switching speed. A second valve 27 is placed in the channel 25, 26, leading from the delay chamber 18 to the operating space, which is opened when the primary speed is greater than a second switching speed. A scoop tube 31 is fixed to the secondary wheel 12. The scoop tube 31 has an inlet opening 32 which is located in the radially outer region of the coupling inner space and extends from there to a switch-valve in the radially inner region of the coupling, thereby allowing the operating fluid delivered by the drag tube to enter the delay chamber 18 only when the primary speed is less than a third switching speed.

In a preferred embodiment of the invention, the blades of said primary wheel have a ratio of the inner diameter to the outer diameter which is greater than 0.4, and more particularly the ratio is preferably between 0.5 and 0.6, the secondary wheel having a plurality of circumferentially spaced radially extending cells of varying radial length.

We claim:

1. A hydraulic coupling of the type having a constant volume of operating fluid comprising
a bladed primary wheel and a bladed secondary wheel having an operating space therebetween,
said bladed primary wheel having a plurality of circumferentially spaced radially extending blades and being provided with a blade-free ram space adjacent to the inner radius of the blades of the primary wheel,
said bladed primary wheel including means defining a delay chamber fixedly mounted to the primary wheel for rotation therewith, first channeling means for passing an operating fluid from said ram space to said delay chamber, first valve means for closing said first channeling means when a primary rotation speed is greater than a first switching speed,
second channeling means for passing the operating fluid from the delay chamber to the operating space, second valve means closing said second channeling means, said second valve means being operable to open said second channeling means when the primary rotation speed is greater than a second switching speed,
a scoop tube fixedly mounted to said bladed secondary wheel for rotation therewith, said scoop tube having an inlet opening proximate the radially outer periphery of the bladed secondary wheel open to said operating space and an outlet opening proximate a radially inner zone of the coupling adjacent to the ram space, and
speed responsive means for selectively passing operating fluid from said scoop tube to the delay chamber only when the primary rotational speed is less than a third switching speed, said operating fluid from said scoop tube otherwise being returned to said operating space.

2. A hydraulic coupling as set forth in claim 1 wherein said delay chamber has a volumetric capacity at least so large that the delay chamber can accommodate the entire volume of the operating fluid.

3. A hydraulic coupling as set forth in claim 1 wherein said means for passing operating fluid from said scoop tube to the delay chamber includes a concentric trap in said bladed primary wheel and a conduit in fluid communication with said first valve means, and a portion of the scoop tube including the outlet opening extending into said concentric trap, wherein said first valve means is operative to pass the operating fluid into said delay chamber when the primary rotational speed is less than the third switching speed.

4. A hydraulic coupling as set forth in claim 3 wherein said delay chamber has a volumetric capacity at least so large that the delay chamber can accommodate the entire volume of the operating fluid.

5. The hydraulic coupling as set forth in claim 1, wherein the first valve means comprises a centrifugally operated rotary slide valve.

6. The hydraulic coupling as set forth in claim 2, wherein the first valve means comprises a centrifugally operated rotary slide valve.

7. The hydraulic coupling as set forth in claim 3, wherein the first valve means comprises a centrifugally operated rotary slide valve.

8. The hydraulic coupling as set forth in claim 4, wherein the first valve means comprises a centrifugally operated rotary slide valve.

9. The hydraulic coupling as set forth in claim 1 wherein said second switching speed is slightly greater than said first switching speed.

10. The hydraulic coupling as set forth in claim 5 wherein said second switching speed is slightly greater than said first switching speed.

11. The hydraulic coupling as set forth in claim 1 wherein the third switching speed is equal to the first switching speed.

12. The hydraulic coupling as set forth in claim 5 wherein the third switching speed is equal to the first switching speed.

13. The hydraulic coupling as set forth in claim 9 wherein the third switching speed is equal to the first switching speed.

14. A hydraulic coupling as set forth in claim 1 wherein the blades of said primary wheel have a ratio of the inner diameter to the outer diameter which is greater than 0.4, the secondary wheel having a plurality of circumferentially spaced radially extending blade cells of varying radial length.

15. A hydraulic coupling as set forth in claim 14 wherein said ratio is between 0.5 and 0.6.

* * * * *